United States Patent Office 3,778,320
Patented Dec. 11, 1973

3,778,320
NON-POLLUTING DISPOSAL OF EXPLOSIVES AND PROPELLANTS
Samuel J. Yosim, Woodland Hills, LeRoy F. Grantham, Calabasas, and Donald A. Huber, Canoga Park, Calif., assignors to Rockwell International Corporation
No Drawing. Filed June 20, 1972, Ser. No. 264,680
Int. Cl. C06b 1/04
U.S. Cl. 149—109
14 Claims

ABSTRACT OF THE DISCLOSURE

Unwanted explosives and propellants are destroyed in a safe non-polluting manner by being contacted with a hot molten salt containing as essential reactive component alkali metal carbonate or hydroxide or mixtures thereof. Some of the resulting decomposition products that would ordinarily be released as atmospheric pollutants react with or are retained in the melt. Any combustible matter present in the melt may be further reacted by use of oxidative molten salts alone or in combination with oxygen added to the melt. Formed gaseous products may be treated in a second reaction zone to complete oxidation of any combustible matter present before discharge of the gases to the atmosphere. The reactive component of the treated melt may be regenerated, or the melt may be disposed of, preferably by reaction with lime in an aqueous or molten medium to form a water-insoluble calcium salt residue. Particularly effective and preferred reactive molten salts are the NaOH-KOH and $Li_2CO_3$-$Na_2CO_3$-$K_2CO_3$ eutectic mixtures.

BACKGROUND OF THE INVENTION

This invention relates to a process for the non-detonating disposal of explosives and propellants. It particularly relates to such a process employing molten salts which results in substantially reduced emission of enviornmental pollutants.

After a specified storage period, aged explosives are destroyed since unpredictable characteristics may develop during longer storage periods. Also a need exists to dispose of obsolescent explosives. Most explosives are destroyed by burning in an open area. Others are destroyed by detonation in a safe zone. As ordinarily practiced, both of these methods of destroying obsolescent and aged exposives results in environmental pollution. During the open combustion or detonation process, pollutants such as smoke, hydrogen chloride, nitrogen oxides, and carbon monoxide are given off. In addition, undesirable dust clouds are formed from detonation. Because of concern with minimizing all sources of environmental pollution, the need exists for developing alternate methods for disposing of unwanted explosives.

The elimination of sources of air and water pollution has been the subject of many previous efforts not related to the explosives field. For example, in U.S. Pat. No. 3,438,722, entitled, "Removal of Sulfur Oxides From Flue Gases," there is described the use of a molten salt bath containing alkali metal carbonate, particularly the ternary eutectic, as an active absorbent for sulfur oxides present in waste gases. In U.S. Pat. No. 3,642,583 is shown a listing of various neutral and active molten salt baths considered suitable for catalytically inducing the oxidation of various wet organic waste materials. A related catalytic oxidation process using molten salts is shown in U.S. 3,647,358. Molten salt baths have also been used in industrial applications for heat-transfer processes. Also, molten alkali metal carbonate, alone or in admixture with alkali metal sulfates, have been used in the reforming of hydrocarbon fuels, as shown in U.S. Pat. No. 3,505,018.

However, an ideal process for the practical disposal of explosives and propellants must be able to satisfy as many as feasible of a wide variety of frequently conflicting requirements. The process must be a safe one, preferably non-detonating. Minimal environmental pollution should result. The process should be competitive economically with other non-polluting processes and be able to cope with a wide variety of different liquid and solid explosives and propellants in different particle sizes and amounts in a rapid expeditious manner. Since explosives are temperature-sensitive materials that can undergo very rapid self-propagating decomposition with the consequent rapid liberation of heat and pressure, the use of hot molten salts has not heretofore been considered a practical method for disposing of explosives and propellants. For example, many of the explosives and propellants of military and industrial importance have defined explosion temperatures below the melting point of many molten salt baths.

It has now been surprisingly discovered that the particular molten salt baths of the present invention can be safety and effectively used in the disposal of explosives and propellants. The present process further offers a unique combination of advantageous features not heretofore available in a single technique, thereby allowing for the practical disposal of a wide variety of explosive compounds, whether low explosives or high explosives, solids or liquids, and whether in particulate or lump form, in a safe, non-polluting manner.

SUMMARY OF THE INVENTION

It is therefore an object of the present invention to provide a simple, rapid, non-detonating practical process for the disposal of explosives and propellants resulting in substantially reduced emission of environmental pollutants compared with hitherto available methods. Unless otherwise indicated by the context, the term "explosive" is considered as also including the term "propellant."

In accordance with the broad aspects of the present invention, the explosive or propellant to be destroyed is brought into reactive contact in a first reaction zone at a temperature between 150 and 1000° C. with a hot molten salt containing alkali metal hydroxide or alkali metal carbonate as the reactive salt component. Particularly preferred reactive components of the molten salt are the NaOH-KOH eutectic mixture and the ternary eutectic mixture of the carbonates of Li, Na, and K. For certain applications the explosive may be floated on the surface of the melt, preferably under an inert atmosphere. However, it is particularly preferred in order to promote rapid decomposition of the explosive and minimize atmospheric pollution that the explosive to be disposed of be in submerged form below the surface of the melt.

Combustion of the explosive occurs most effectively while submerged beneath the surface of the molten salt. The submerged reactive contact as herein defined includes spraying the molten salt on the body of the explosive so as to coat it with a fine layer of molten salt, as well as direct immersion and retention of the explosive within the body of the molten salt bath. Depending on the explosive being treated and the feasible or desired reaction rate, temperatures between 150 and 1000° C. may be effectively employed in disposing of the explosive. For most applications, a temperature between 200 and 600° C. is effective in destroying 1-kg. quantities of explosive in a rapid period of time ranging from several seconds to less than an hour. At temperatures between 200 and 400° C., it is preferred to use the NaOH-KOH eutectic as the reactive molten salt component. Where the ternary molten carbonate eutectic is used as the principal component of the molten salt bath, temperatures between 400 and 600° C. are preferred.

Depending on the type of explosive or propellant and its internal oxidizing power, as well as the reaction temperature, it may be necessary to further consume the decomposition products formed, such as carbonaceous materials. This may be accomplished by bubbling air into the melt during the reaction or after the reaction is complete, since the carbonaceous particulate matter will be present in the melt in a finely divided, highly reactive form. An alternative method for combusting excess carbon present is to add alkali metal nitrite or nitrate to the melt. These nitrogenous compounds react with the carbon to form carbon dioxide and nitrogen. At the same time, where alkali metal carbonate initially is used as the reactive component, this salt will be regenerated. In still another method for combusting carbon, particularly at temperatures between 800 and 1000° C., internal heat generation in the melt may be obtained by adding an alkali metal sulfate to the carbonate-containing melt. As shown in U.S. Pat. 3,567,412, "Gasification of Carbonaceous Fuels," the presence of sodium sulfate in an alkali metal carbonate melt is effective in promoting the oxidation of carbonaceous materials.

Depending upon the explosive being destroyed as well as the environmental pollution requirements, it may be desirable or necessary to treat the gaseous effluent product, which may contain finely divided carbonaceous particulate matter, in a second zone in the presence of a source of oxygen to complete oxidation of combustible matter present. Air is a readily convenient and inexpensive preferred source of oxygen. A metal mesh, such as one of stainless steel, is preferably present in this second reaction zone to provide a reaction surface for ready ignition and complete oxidation of the combustible matter present. At the same time, the metal mesh serves to demist particles of the molten salt composition present in the gaseous effluent prior to venting the effluent to the atmosphere. Thereby the vented gaseous effluent product consists essentially only of such gases as carbon dioxide, water vapor, and nitrogen.

DESCRIPTION OF THE PREFERRED EMBODIMENTS

In the preferred aspects of the present invention, an explosive or propellant is safely and effectively decomposed by submerged reactive contact with a molten salt containing an alkali metal hydroxide or carbonate as active component. Where for certain explosives it is desired to perform the decomposition reaction at temperatures as low as 150° C., the binary 70 mole percent KOH–30 mole percent LiOH eutectic (M.P. 110° C.) may be employed. For reactions below 200° C., the equimolar KOH-NaOH eutectic (M.P. 170° C.) is particularly suitable. However, at reaction temperatures below 200° C., a comparatively long period of time is required for completion of the decomposition of the explosive and oxidation of the resulting carbonaceous decomposition products. Thus temperatures between 200 and 600° C. are preferred, depending upon the reaction rate desired and the nature of the explosive.

It is preferred to use a ternary mixture of the carbonates of lithium, sodium and potassium, particularly the eutectic composition, because of its low melting point, chemical stability, acid-neutralizing power and general potentiality for being readily regenerated in substantial amount. Also, the formation of carbon dioxide in the bath during reaction does not alter the melting point of the bath. Where the low-melting NaOH-KOH eutectic is used, absorption of carbon dioxide results in formation of the binary carbonate, which has a higher melting point than the ternary carbonate eutectic mixture. In using the ternary carbonate eutectic, a preferred temperature range is between 400 and 600° C.

It has surprisingly been found that rapid decomposition of the explosive without concomitant detonation is feasible even where the temperature at which the explosive is contacted by the molten salt is above the standard autoignition or explosion temperature (temperature required to cause explosion in 5 sec.). Thus it is considered feasible in certain instances to dispose of various explosives in a rapid manner at elevated temperature between 800 and 1000° C. In general, the higher the reaction temperature the more rapid is the rate of decomposition of the explosive and of oxidation of the carbonaceous decomposition products. Thereby the need for further secondary combustion may be avoided. Where elevated temperatures between 800 and 1000° C. are employed, these are attained by using a molten alkali metal carbonate bath containing between 1 and 25 wt. percent alkali metal sulfate. While a ternary alkali metal carbonate bath may be used, a sodium carbonate-sodium sulfate mixture is molten at these elevated temperatures and is preferred because it is less costly and more effective in oxidizing carbonaceous material. When oxygen is passed into such a molten bath, internal heat generation occurs by the indirect combustion of carbonaceous material in accordance with the following reactions:

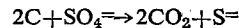

The net reaction $C+O_2 \rightarrow CO_2$ being an exothermic one, the desired high reaction temperature between 800 and 1000° C. may be maintained. Excess heat can be removed from the melt by increasing the amount of air blown through the melt.

Various inert or active materials may be added to the bath to serve as temperature diluents, stabilizers, and oxidants. Where alkali metal nitrites and/or nitrates are added to the bath to achieve oxidation of formed carbonaceous particulate and gaseous products, these salts should not comprise more than 25 wt. percent of the bath, amounts from 1 to 10 wt. percent being considered sufficient for most purposes of oxidation.

The particularly preferred reactive molten salt component used in the practice of this invention is the ternary alkali metal carbonate mixture. Where the melt consists essentially of only the alkali metal carbonates, a ternary mixture consisting of potassium carbonate, lithium carbonate, and sodium carbonate is utilized having a melting point between 400 and 600° C. While the melting points of the three individual carbonates fall within the range of 725 to 900° C., a mixture containing approximately equal amounts by weight of the carbonates of potassium, lithium and sodium has a melting point of about 400° C., close to that of the eutectic composition.

The ternary alkali metal carbonate system has been described by G. J. Janz and M. R. Lorenz in J. Chem. Eng. Data 6, 321 (1961). As described therein, the alkali metal carbonate eutectic melts at 397±1° C. and consists of 43.5, 31.5, and 25.0 mole percent of the carbonates of lithium, sodium, and potassium, respectively. Since the low melting region around the eutectic temperature is quite broad, a relatively large variation in composition (±5 mole percent) does not change the melting point markedly. Thus, a suitable ternary eutectic composition range, in mole percent, consists of 45±5 lithium carbonate, 30±5 sodium carbonate, and 25±5 potassium carbonate.

Other nonreactive molten salts may be combined with the alkali metal carbonates to serve as inexpensive diluents or to lower the useful temperature. For example, lithium-potassium salt mixture containing chloride, sulfite and carbonate is molten at a temperature between 325 and 350° C. Where such diluent salts are utilized, either a single alkali metal carbonate or a binary or ternary mixture of the alkali metal carbonates is combined therewith, the final mixture containing two or more alkali metal cations. In such a system as little as 2 mole percent alkali metal carbonate may be present with the remaining 98 mole percent being an inert diluent carrier, although at least 5-10 mole percent of alkali metal carbonate is preferable. Illustrative of such a suitable mixture is one utilizing a LiCl-KCl eutectic (348° C.) wherein the starting salt ratio consists of 64.8 mole percent LiCl and 35.2 mole percent KCl. An absorbent molten mixture containing 90 mole percent of the LiCl-KCl eutectic and 10 mole percent of a corresponding molar ratio of potassium and lithium carbonates has a melting point of about 375° C. Suitable chloride-carbonate molten salt mixtures useful in the practice of this invention contain, in mole percent, 15-60 $K^+$, 40-85 $Li^+$, and 0-20 $Na^+$ as cations and 10-98 $Cl^-$ and 2-90 $CO_3^=$ as anions.

Where alkali metal hydroxides constitute the active component of the reactant molten salt, the equimolar KOH-NaOH eutectic mixture having a melting point of 170° C. is preferred, generally without the presence of other components. However, where desired for certain purposes, other salts may be added as inexpensive diluents, melting point depressants, oxidants and the like. Where considerable amounts of carbon dioxide are evolved in the destruction of the explosive, these are absorbed by the hydroxides, which are then converted to the corresponding carbonates. Since the binary $Na_2CO_3$-$K_2CO_3$ eutectic has a much higher melting point than the ternary alkali metal carbonate eutectic, this consideration becomes a factor in the choice of active salt component. Thus where maintaining a relatively uniform melt temperature during continued operation of the process is an important consideration, it is generally preferred to utilize the ternary alkali metal carbonate eutectic as the reactive molten salt component, alone or with added inert or active salts.

While many of the explosives inherently provide their own source of chemically available oxygen upon reaction with the molten salt, further oxidation may be required to convert incompletely combusted solid or gaseous decomposition products to carbon dioxide and water vapor. This is accomplished either by further oxidative treatment within the melt, such as by addition of oxygen or nitriles and/or nitrates to the melt or by secondary combustion of unreacted gaseous effluent products in a second reaction zone by feeding a source of oxygen such as air to a burner zone. Thus carbon monoxide present in the evolved effluent is reacted on a wire metal mesh and converted to carbon dioxide before being evolved to the atmosphere. Alternatively, particularly where high temperature combustion is desired, internal heat generation by indirect combustion of carbonaceous products may be provided in the melt by adding an alkali metal sulfate to an alkali metal carbonate while feeding oxygen to the melt. Oxidative treatment in the melt or secondary combustion may be used separately or in combination.

Several different techniques, alone or in combination, may be effectively employed in accordance with the present invention for disposing of the explosives and propellants in a rapid, safe and effective manner despite the relatively high temperatures of the molten salt baths employed and the ordinarily sensitive nature of the explosives being treated. Basically, in the various techniques employed, the reaction of the explosive to be disposed of preferably occurs in fully submerged form beneath the surface of the melt. Alternatively, although less desirable, the explosive may in certain applications be floated on the surface of the melt under an inert atmosphere blanket. With full submersion, there is rapid contact with the molten salt and effective heat dissipation throughout the body of the molten salt. Considerable chemical reaction occurs in the melt as is evidenced by continued vigorous bubbling of the melt during the period of time that a visible flame is present and also for several minutes after the flame has disappeared. This is confirmed by analysis of the reaction products found in the melt.

Illustrative of suitable submerging techniques are those in which the explosive material is enclosed in a fine-wire mesh which is weighted so that the material will remain submerged after contacting the melt. In another method, the explosive is attached to several layers of fine screen which is remotely lowered by a rod. Such a method does not require that the explosive be weighted. In another method, the molten salt is sprayed over the explosive so that the entire surface of the explosive material is always in contact with and covered by the molten salt. Such a spray is readily produced by the pumping of melt through a spray nozzle. In another method, pneumatic conveyance is used wherein the material is blown through a tube submerged beneath the surface of the melt. Air may be used as the source of conveyor gas, particularly where concurrent oxidation of formed products in the melt is desired. Such techniques are capable of disposing of explosives in lump or granular form in incremental amounts varying from 0.05 to 1 kg. or larger. By employing larger tubes or several tubes in parallel, substantial quantities of explosives may be destroyed, with individual feed rates per tube of 0.5 kg./hr. to 5 kg./hr. being readily attainable.

A wide variety of commercially significant explosives and propellants may be effectively treated by the present process by modification of reaction conditions, as herein set forth, depending upon the physical and explosive properties of the particular material being disposed of. Thus particle size and weight of the explosive will to some extent be related to the feed rate of the explosive to the molten salt. Similarly, the chemical composition of the explosive and the need for further oxdiation will determine the additive salts to be added to the reactive salt components as well as the other techniques to be utilized. Also, while a high reaction temperature promotes rapid and effective disposal of the explosive, control of temperature may be required with respect to the treatment of temperature-sensitive explosives having particularly low explosion temperatures. It has been found, however, that the reaction temperature employed may readily exceed the standard auto-ignition or explosion temperature, namely the minimum temperature at which explosion occurs in five seconds, without any resulting detonation occurring. Thus the present process is considered generally effective even in the disposal of heat-sensitive explosives and those undergoing spontaneous decomposition, except that such explosives will usually be reacted at generally lower temperatures.

Illustrative of explosives considered suitable for treatment by the present process, particularly those of technological interest, are the following: ammonium nitrate, glyceryl nitrate, diglyceryl tetranitrate, glycol dinitrate, diethylene glycol dinitrate, trimethylolethane trinitrate, PETN, DPEHN, TNT, Tetryl, Cyclonite, HMX and Composition B. In general, propellants treated by the present process which use or contain low-energy explosives may be more rapidly disposed of by being contacted at somewhat higher temperatures than are utilized for disposing of high-energy explosives. However, where the propellant composition uses or contains a high-explosive component or ingredient, the method of disposal used will be similar to that employed for the high-energy explosives. Because of the basic reactivity of the alkaline molten salts used as reactive components, it is immaterial for the effectiveness of the present process as to whether the explosive or propellant is in solid, liquid, or solution form or whether the explosive is present as a single or binary composition or whether the propellants are double-base compositions containing various additives or comprise polymeric matrix composite propellants. Thus any of the bipropellant systems containing liquid fuels such as the hydrocarbon fuels of the JP types, ethyl alcohol, hydrazine, hydrazine derivatives and the like are readily reacted by the molten salt system.

The following examples illustrate the practice of the present invention, but are not to be construed as limiting the general broad applicability of the present process.

EXAMPLES

The molten salt bath was located in the center of an experimental test apparatus consisting of an armor-plated three-sided cubicle with viewing windows. Small pieces of explosives were dropped into the melt by allowing them to roll through a non-metallic inclined pipe leading from the outside of the cubicle to the molten salt bath. This enabled visually viewing the reaction between the molten salt-explosive reaction and the effect on the surrounding atmosphere through the windows. The molten salt bath was contained in a stainless steel vessel surrounded by an insulated clam-shell heater, with a thermocouple placed between the melt and the heater. The temperature of the melt was also monitored directly prior to introduction of the explosives.

Twelve runs were performed over a temperature range of 230–525° C. Ten of these were carried out with Composition B. Six runs were with the hydroxide melt (Runs 1–6); three were with the carbonate melt (Runs 7–9); and in a control run (No. 10) the explosive was burned in the open without any melt present. In Run No. 4 the explosive which ordinarily floated on the melt surface in the other runs was enclosed in a light wire mesh and weighted so that it was submerged during most of the reaction. It was noted that the extent of smoke emission occurring in Run No. 4 was much less than when the explosive was burned in the open (Run No. 10).

The results obtained are summarized in Table 1.

TABLE 1.—MOLTEN SALT COMBUSTION OF EXPLOSIVES [a]

| Run No. | Explosive [b] | Molten salt [c] | Temperature (° C.) | Time for combustion (sec.) | Extent of vapor or smoke emissions | Comments |
|---|---|---|---|---|---|---|
| 1, 2, 3 | Composition B | NaOH-KOH eutectic | 230 | 8–11 | Moderate | |
| 4 | do | do | 230 | [d] 4 | Very light [e,f] | Sample was weighted so it would sink below the melt surface. |
| 5, 6 | do | do | 315 | 5–7 | Moderate [e,f] | |
| 7, 8 | do | M₂CO₃ | 465 | 3–4 | Light [e,g] | |
| 9 | do | M₂CO₃ | 465 | 5–6 | Moderate [e,f] | 10-gram sample tested. |
| 10 | do | None | 465 | 3–4 | Light | Control: Open burning. Same set-up used without salt in vessel. |
| 11, 12 | Propellant | M₂CO₃ | 525 | 3–4 | Very light | Sparkles emitted during combustion (aluminum combustion). Smoke (HCl vapor) much less than when burned in open. |

[a] Approximately a 5-gram sample of explosive was used in each test except for Test 9 in which 10 grams was used.
[b] Composition B is 60% RDX (Cyclonite) and 40% TNT (2,4,6-trinitrotoluene); standard solid propellant is a mixture of 70 wt. percent NH₄ClO₄, 16% Al, and 14% polybutadiene.
[c] M₂CO₃ is the Li₂CO₃-Na₂CO₃-K₂CO₃ eutectic.
[d] Approximately 8–10 sec. were required for complete reaction—a flame was visible for only about 4 sec.
[e] Black smoke was visible right at the end of the burn.
[f] Black residue on melt surface dissolved or disintegrated upon stirring.
[g] In Run No. 7, a reddish violet smoke was given off before ignition.

It was noted that when the sample was submerged in the melt (Test 4), compared with reacting on the surface of the melt (Tests 1, 2 and 3), far less smoke was emitted.

It was further noted that chemical reaction of the explosive in the melt occurred at all stages. Thus there was vigorous bubbling in the melt before the explosive ignited, during the burn, and after combustion ceased. Analysis of the melt showed the presence of chloride, with no HCl odor being detected in the off-gas.

One possible mechanism for the vigorous bubbling observed is believed to be the reaction of the residual carbon or carbon-containing material with formed reaction products, such as nitrates or nitrites, to form nitrogen gas and carbon dioxide. Typical exemplary reactions are:

$$4MNO_3 + 5C \rightarrow 2M_2CO_3 + 2N_2 + 3CO_2 \quad (M = Li, K, Na)$$
$$4MNO_2 + 3C \rightarrow 2M_2CO_3 + 2N_2 + CO_2$$

The foregoing reactions allow for in situ regeneration of a portion of the carbonate.

The present process permits the trapping of all acidic gases such as HCl, $SO_2$, and $NO_2$ by the active carbonate or hydroxide present in the melt. Where CO is present in the off-gas, a catalytic air oxidation of the CO to $CO_2$ on a stainless steel mesh results in removal of the CO in the second stage of combustion. Thus the present process is capable of safely and effectively disposing of explosives while resulting in substantially reduced emission of environmental pollutants. With suitable design modifications as well as use of second combustion, the presence of acidic gases and incomplete combustion products can be essentially eliminated so that the gaseous effluent emitted to the atmosphere will contain only carbon dioxide, nitrogen and water vapor. The molten salt containing the retained decomposition products of the explosive may be further treated to regenerate reactive components, or is readily disposed of, preferably by treatment with lime as a solid or in aqueous solution to form a generally water-insoluble calcium salt residue. Such insoluble calcium salts will be formed by reaction of the lime with carbonate, fluoride, phosphate, and sulfate components present in the spent melt. Chloride present in the spent melt will remain in solution.

It will of course be realized that various modifications can be made in the design and operation of the present invention without departing from the spirit thereof. Thus while the principle of the invention and its preferred mode of operation have been explained, and what is now considered to represent its best embodiment has been illustrated and described, it should be understood that within the scope of the appended claims, the invention may be practiced otherwise than as specifically illustrated and described.

We claim:

1. A non-detonating process for the disposal of explosives and propellants which results in substantially reduced emission of environmental pollutants comprising:
   bringing the explosive or propellant into reactive contact in a first reaction zone at a temperature between 150 and 1000° C. with a molten salt composition containing alkali metal carbonate and/or alkali metal hydroxide as principal reactive component to pyrolytically decompose the explosive or propellant, accompanied by at least partial oxidation thereof, to form decomposition products including a gaseous effluent, and
   emitting the gaseous effluent to the atmosphere while retaining remaining decomposition products in the melt.

2. The process of claim 1 wherein said explosive or propellant is brought into submerged reactive contact with said molten salt composition.

3. The process of claim 1 wherein said molten salt composition is at a temperature between 200 and 400° C. and its principal reactive component consists essentially of the NaOH-KOH eutectic.

4. The process of claim 1 wherein said molten salt composition is at a temperature between 400 and 600° C. and its principal reactive component consists essentially of a ternary mixture of the carbonates of lithium, sodium, and potassium.

5. The process of claim 4 wherein said ternary mixture consists essentially of, in mole percent, $45\pm5$ lithium carbonate, $30\pm5$ sodium carbonate and $25\pm5$ potassium carbonate.

6. The process of claim 1 wherein said molten salt composition is at a temperature between 800 and 1000° C., its principal reactive component consists essentially of sodium carbonate containing from about 1 to 25 wt. percent sodium sulfate, and a source of oxygen is fed into said first reaction zone.

7. The process of claim 6 wherein said source of oxygen is air.

8. The process of claim 1 wherein said molten salt composition contains from about 1 to 25 wt. percent alkali metal nitrate and/or nitrite.

9. The process of claim 8 wherein the principal reactive component of said molten salt composition consists essentially of a ternary mixture of the carbonates of lithium, sodium, and potassium.

10. The process of claim 1 wherein prior to the emission of the gaseous effluent to the atmosphere it is passed into a second reaction zone in the presence of a source of oxygen to complete oxidation of any combustible matter present in said effluent whereby the gaseous effluent product vented to the atmosphere from said second zone consists essentially only of gases selected from carbon dioxide, water vapor, and nitrogen.

11. The process of claim 10 wherein said source of oxygen is air.

12. The process of claim 11 wherein a metal mesh present in said second reaction zone serves to provide a surface for ignition and complete oxidation of combustible matter in said second reaction zone, said metal mesh also serving to demist particles of the molten salt composition present in the gaseous effluent prior to the vending of said effluent to the atmosphere.

13. The process of claim 1 further including the steps of pouring the melt containing the retained decomposition products of the explosive or propellant from the reaction vessel, and then reacting the resulting poured product with lime to form a water-insoluble calcium salt residue.

14. The process of claim 13 wherein said melt is poured into a pool of water, and the resulting aqueous product is reacted with lime to form said water-insoluble calcium salt residue.

References Cited

UNITED STATES PATENTS

| | | | |
|---|---|---|---|
| 2,918,717 | 12/1959 | Struxness et al. | 252—301.1 W |
| 3,332,884 | 7/1967 | Kelmar | 252—301.1 W |
| 3,337,464 | 8/1967 | Sayles | 149—109 X |

STEPHEN J. LECHERT, JR., Primary Examiner

U.S. Cl. X.R.

149—46, 88, 92, 93, 101, 105